Patented Dec. 8, 1942

2,304,133

UNITED STATES PATENT OFFICE 2,304,133

PRODUCTION OF ANHYDROUS ALUMINUM SULPHATE

William S. Wilson, Brookline, and Neil A. Sargent, Winchester, Mass., assignors to Monsanto Chemical Company, St. Louis, Mo., a corporation of Delaware No Drawing. Application July 29, 1940, Serial No. 348,204

12 Claims. (Cl. 23—124)

This invention relates to the production of anhydrous aluminum sulphate from aqueous solutions containing aluminum sulfate.

The customary method of manufacture of commercial aluminum sulphate involves the reaction of bauxite, commercial aluminum hydrate, or other acid soluble aluminous materials with sulphuric acid of 50–55° Bé. strength, with the addition of water or wash liquors, so that a neutral or basic solution of aluminum sulphate results which is subsequently boiled down to a condition of supersaturation and then permitted to solidify in large pans. This solid product contains from 16 to 18% of soluble alumina and from 40 to 45% of water, and is in the form of a glass-like solid solution, which, in contrast to the known crystalline hydrate of aluminum sulphate containing 18 molecules of water and about 15% of alumina, does not lend itself readily to dehydration to an anhydrous product.

Obviously it would be of decided advantage to both the consumer and producer of aluminum sulphate to be able to produce an anhydrous material from the commercial product prepared as described above. It has been found, however, that if an attempt is made to dehydrate commercial aluminum sulphate by heating, the material softens up to a semi-fluid sticky mass. Further heating only causes fluidity throughout with the exception of the top surface which is cooled to a temperature below the solidification point by evaporation. This results in the formation of a crust or film over the surface which increases the difficulty, both mechanically and thermally, of removing water vapor. This fluid, sticky melt also tends to adhere strongly to any metallic surface, and in the course of continued operation of the equipment will build up accretions of sulphate which require frequent removal; a factor of disadvantage in any commercial process, and especially so in this case where the deposited material is an extremely hard, cement-like structure.

Numerous methods have been devised for overcoming the difficulties due to the physical characteristics of the solid solution formed commercially, but none of them has been entirely satisfactory. One method of treatment involves spray drying, or almost instantaneous dehydration of extremely fine droplets of concentrated aluminum sulphate solution in a suitable apparatus. The main disadvantage of this type of process is that the product which results from this spray evaporation is very bulky and voluminous, so that an appreciable amount of the economic advantage gained by the dehydration is lost. Other methods which have been employed are concerned with mechanical means for handling the semi-fluid to fluid mass which is formed as a result of heating the commercial product. That these methods possess certain inherent disadvantages is evidenced by the fact that anhydrous aluminum sulphate is not now produced commercially to any appreciable extent, if at all.

It is accordingly an important object of the present invention to provide a method for quickly and easily preparing an anhydrous aluminum sulphate product, which method is adapted to be used in connection with and sequentially to the usual method of making commercial aluminum sulphate outlined above.

A further object of the invention is to provide a method for preparing anhydrous aluminum sulphate from aqueous solutions thereof.

A further object of the invention is to provide a method of making an anhydrous product of the type described, which product may be of widely varying bulk or apparent density.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

According to our invention, we provide an economical and mechanically feasible process for the manufacture of anhydrous aluminum sulphate which is effected by intimately mixing together anhydrous aluminum sulphate and an aqueous solution of aluminum sulphate in the proper ratio to form a substantially homogeneous mixture in which the $Al_2O_3$ is present in the proportion of at least 22 to 23% by weight. The product thus obtained may be readily dehydrated in the conventional type of equipment without encountering the semi-fluid, sticky stage through which commercial aluminum sulphate normally passes on heating. Moreover, by varying certain steps of the procedure, we are able to obtain a product of varying density.

Suitable aqueous solutions for the purposes of this invention are the solutions obtained during the manufacture of commercial aluminum sulphate prior to boiling down to a solid product. These solutions may range in $Al_2O_3$ content from 1 to 17%, although solutions containing above 14% are generally supersaturated and in a metastable condition. Solutions containing from 1 to 9% of $Al_2O_3$ can be used at atmospheric temperatures, but raised temperatures are required where solutions of above 9% $Al_2O_3$ are employed. For example, solutions containing from 9 to 12% of $Al_2O_3$ require a temperature of about 50° C., if crystallization is to be avoided prior to mixing with the anhydrous aluminum sulphate; solutions containing from 12 to 14% $Al_2O_3$ should be maintained at 70 to 80° C.; and the supersaturated solutions containing from 14 to 17% of $Al_2O_3$ should be kept at temperatures just below the boiling point or in the range of 95 to 105° C. The supersaturated solutions should not be kept too long at these temperatures, and care should be taken that no crystal seed is present to induce crystallization and solidification prior to mixing them with the anhydrous material.

Following is a specific example to illustrate one way in which the instant invention can be carrid out: to a mixer such as an ordinary cement mixer, one hundred pounds of finely divided anhydrous aluminum sulphate and thirty-one pounds of aluminum sulphate solution containing 8.5% $Al_2O_3$ and preferably free of insolubles are fed concurrently. The proportions of anhydrous material and aluminum sulphate solution are regulated so that the resulting dry pellets will contain approximately 22 to 23% or more soluble $Al_2O_3$. The mixing may be carried out at ordinary temperatures. The mixture will form dry pellets which are then passed through a calciner heated to a suitable temperature. The only requirement with respect to the temperature gradient of the calciner is that prior to their exit the pellets be subjected to a temperature of 400 to 500° C. for three or four minutes in order to insure complete removal of the water. A quantity of the product, for example one hundred pounds, is then recirculated for use in preparing further quantities of the anhydrous material and the remainder is available for immediate sale or storage. The portion of the anhydrous material which is recirculated is preferably ground so it will pass through a ten mesh screen or finer before being used in the preparation of further quantities of anhydrous material.

More concentrated solutions of aluminum sulphate may, of course, be used, care only being taken to insure that they remain liquid prior to the mixing operation. For example, a solution containing 15% $Al_2O_3$, which is at 100° C., is mixed with the proper amount of anhydrous material. In this case, 100 pounds of anhydrous sulphate may be mixed with as much as 62 pounds of the 15% $Al_2O_3$ solution without falling below the necessary amount of $Al_2O_3$ in the mixture. The resulting dry pellets may be dehydrated as above. Hot anhydrous aluminum sulphate may be used in the mixing operation.

By regulating the temperature of the mixing it is possible to vary the properties of the final anhydrous product. Thus, if the mixing is carried out at temperatures between 110° and 120° C., dense, hard pellets are obtained upon calcination; however, as the mixing temperature is increased above 120° C., the anhydrous product which is prepared becomes more bulky and has a lower apparent specific gravity. At temperatures of 200° C. or higher the sulphate swells so that the anhydrous product resembles pop-corn. Moreover, if the temperature of mixing is maintained below 110° C., although there is no unusual swelling in the mixer, unless the calcining operation is carried out extremely slowly, the pellets swell up to give the bulky product. Thus, we have found that the apparent density may be varied from approximately .64 or even more to .19 or even less by varying the temperature in the mixer.

The anhydrous aluminum sulphate and the sulphate solution may be mixed in any desired proportions, provided that the percentage of $Al_2O_3$ in the final mixer product is not substantially less than 22 to 23%. Thus, even a starting ratio of sulphate solution to anhydrous sulphate which has an overall content of $Al_2O_3$ less than 22 to 23% may be employed, provided that the mixer is heated sufficiently to evaporate enough water to produce a final mixer product having at least the above percentage. In order to obtain the proper agglomeration of the mixture, however, it is necessary that the sulphate solution which is added to the anhydrous material shall contain at least 30% $H_2O$ or that hot fluid gases shall be introduced into the mixer to provide additional heat, or that the temperature shall be increased in other ways.

Instead of employing a cement mixer, a screw conveyor may be used in carrying out the mixing. In this case the solution may conveniently be sprayed onto a quantity of the anhydrous material being carried along by the conveyor.

If desired, the mixer and calciner may be combined as one piece of equipment, the pelleted mixture being carried directly into the calciner. Also, the process may be carried out on a continuous basis, the solution and anhydrous sulphate in proper proportion being continuously added to and, continuously discharged from the rotating piece of equipment. The calciner may, of course, also be operated on a continuous basis.

It has been found that when the final temperature of the calcination is not permitted to rise as high as 500° C. the resulting product is more quickly soluble than one which has been dehydrated at a temperature of 500° C. For example a top temperature of 400° C. forms a more quickly soluble product than a top temperature of 500° C. or more.

Where a small amount of water in the final aluminum sulphate product is not objectionable the final calcination may be carried out at lower temperatures. Likewise a material which is not strictly anhydrous may be used in carrying out this invention but in that case the proportion of solution added must be correspondingly restricted.

It is apparent that the present invention permits the elimination of the large solidification pans employed in the present commercial process to solidify the aluminum sulphate solution after boiling the latter down to the desired concentration, and in addition provides a feasible method for quickly and easily preparing anhydrous aluminum sulphate without encountering the mechanical difficulties caused by passage through the semi-fluid, sticky stage previously considered inevitable. Consequently, there is no gumming up of the apparatus employed for this operation. Moreover, by proper regulation of the mixing temperatures, this process may be operated so as to produce products of widely varying apparent density or bulk. These bulky products have been found to be even more rapidly soluble in water than the ordinary anhydrous product produced by this method. In addition, by the utilization of a solution which is low in insolubles the resulting anhydrous product will likewise be substantially insoluble-free.

It is believed that the advantageous results of the present invention are due to a large extent to the fact that aluminum sulphate having an $Al_2O_3$ content above about 22 to 23% contains more $Al_2O_3$ than the minimum melting sulphate, which is known to contain only from 18 to 20% of $Al_2O_3$. Thus, by increasing the $Al_2O_3$ concentration above that of the minimum melting product in the manner described herein, it is possible to dehydrate the aluminum sulphate without any deleterious effects, as, once the $Al_2O_3$ concentration of the minimum melting product is surpassed, the melting point of the sulphate rises rapidly with further increases in $Al_2O_3$ content and decreases in water content. It should be kept in mind however that the advantages of this invention may be due equally as much to the formation of a crystalline hydrate having an $Al_2O_3$ content of about 22 to 23% and the property of lending itself readily to dehydration in common with the 18 $H_2O$ hydrate previously mentioned. In any case, anhydrous products are easily obtained from aluminum sulphate solutions which are intermediate products of the commercial manufacture of solid aluminum sulphate by proceeding in the manner described herein.

This application is a continuation-in-part of our copending application, Serial No. 210,172, filed May 26, 1938.

What is claimed is:

1. The method of preparing anhydrous aluminum sulphate which comprises mixing an aqueous aluminum sulphate solution with anhydrous aluminum sulphate in an amount sufficient to form a product having at least about 22% soluble $Al_2O_3$ and then driving off the water from the product to form an anhydrous sulphate.

2. The method of preparing a bulky anhydrous aluminum sulphate which comprises mixing an aqueous aluminum sulphate solution with anhydrous aluminum sulphate in an amount sufficient to form a product having at least about 22% soluble $Al_2O_3$, such mixing being carried out at a temperature above 120° C., and then driving off the water from the product to form an anhydrous sulphate.

3. The method of preparing a bulky anhydrous aluminum sulphate which comprises mixing an aqueous aluminum sulphate solution with anhydrous aluminum sulphate in an amount sufficient to form a product having at least about 22% soluble $Al_2O_3$, such mixing being carried out at a temperature below 110° C., and then driving off the water from the product to form an anhydrous sulphate.

4. The method of preparing anhydrous aluminum sulphate which comprises mixing an aqueous aluminum sulphate solution with anhydrous aluminum sulphate in an amount sufficient to form a product having at least about 22% soluble $Al_2O_3$, and then driving off the water at approximately 400° C. from the product to form an anhydrous sulphate.

5. The method of preparing a bulky anhydrous aluminum sulphate which comprises mixing an aqueous aluminum sulphate solution with anhydrous aluminum sulphate in an amount sufficient to form a product having at least about 22% soluble $Al_2O_3$, such mixing being carried out at a temperature above 120° C., and then driving off the water at approximately 400° C. from the product to form an anhydrous sulphate.

6. The method of preparing a bulky anhydrous aluminum sulphate which comprises mixing an aqueous aluminum sulphate solution with anhydrous aluminum sulphate in an amount sufficent to form a product having at least about 22% soluble $Al_2O_3$, such mixing being carried out at a temperature below 110° C., and then driving off the water at approximately 400° C. from the product to form an anhydrous sulphate.

7. The method of preparing anhydrous aluminum sulphate which comprises mixing an aqueous aluminum sulphate solution with anhydrous aluminum sulphate in an amount sufficient to form a product having at least about 22% soluble $Al_2O_3$, driving off the water from the product to form an anhydrous sulphate and then recycling a portion of the product to provide anhydrous aluminum sulphate for mixing with an additional quantity of aluminum sulphate solution.

8. The method for continuously manufacturing anhydrous aluminum sulphate which comprises continuously admixing anhydrous aluminum sulphate and aqueous aluminum sulphate solution in an amount sufficient to form a product having at least about 22% soluble $Al_2O_3$, continuously removing said product from the mixing equipment, and then driving off the water from the product to form an anhydrous sulphate.

9. The method of preparing dense, hard pellets of anhydrous aluminum sulphate which comprises rotationally mixing an aqueous aluminum sulphate solution with anhydrous aluminum sulphate in an amount sufficient to form a product having at least about 22% soluble $Al_2O_3$, such mixing being carried out at a temperature between 110° and 120° C. and resulting in a pelleted product, and then driving off the water from the product to form an anhydrous sulphate.

10. The method of preparing dense, hard pellets of anhydrous aluminum sulphate which comprises rotationally mixing an aqueous aluminum sulphate solution with anhydrous aluminum sulphate in an amount sufficient to form a product having at least about 22% soluble $Al_2O_3$, such mixing being carried out at temperatures which do not cause swelling and resulting in a pelleted product, and then driving off the water from the product to form an anhydrous sulphate.

11. The method of producing a pelleted anhydrous aluminum sulphate which comprises rotationally mixing an aqueous aluminum sulphate solution with ground anhydrous aluminum sulphate in an amount sufficient to produce a mixture containing more $Al_2O_3$ than that present in aluminum sulphate having the minimum melting point, said ingredients being agglomerated and pelleted by said mixing, and subsequently dehydrating the resulting product to form an anhydrous sulphate.

12. The method of preparing dense, hard pellets of anhydrous aluminum sulphate which comprises rotationally mixing an aqueous aluminum sulphate solution with anhydrous aluminum sulphate in an amount sufficient to form a product having at least about 22% soluble $Al_2O_3$, such mixing being carried out at a temperature between 110° and 120° C. and resulting in a pelleted product, and then driving off the water at approximately 400° C. from the product to form an anhydrous sulphate.

WILLIAM S. WILSON.
NEIL A. SARGENT.